United States Patent
Diverdi et al.

(10) Patent No.: US 8,665,258 B2
(45) Date of Patent: Mar. 4, 2014

(54) GENERATING A DEPTH MAP BASED ON A SINGLE IMAGE

(75) Inventors: Stephen J. Diverdi, Mountain View, CA (US); Jonathan D. Ventura, Goleta, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1139 days.

(21) Appl. No.: 12/273,430

(22) Filed: Nov. 18, 2008

(65) Prior Publication Data

US 2013/0127823 A1 May 23, 2013

Related U.S. Application Data

(60) Provisional application No. 61/097,388, filed on Sep. 16, 2008.

(51) Int. Cl.
*G06T 15/00* (2011.01)
*G09G 5/00* (2006.01)

(52) U.S. Cl.
USPC .......................................... 345/419; 345/619

(58) Field of Classification Search
None
See application file for complete search history.

(56) References Cited

U.S. PATENT DOCUMENTS

| | | | |
|---|---|---|---|
| 6,990,681 B2 * | 1/2006 | Wang et al. ................... | 725/105 |
| 7,199,793 B2 | 4/2007 | Oh et al. | |
| 8,411,080 B1 * | 4/2013 | Zimmermann ............... | 345/419 |
| 2005/0140670 A1 * | 6/2005 | Wu et al. ........................ | 345/419 |
| 2007/0098288 A1 * | 5/2007 | Raskar et al. .................. | 382/254 |
| 2008/0150945 A1 * | 6/2008 | Wang et al. .................... | 345/427 |

OTHER PUBLICATIONS

Byong Mok Oh et al., "Image-Based Modeling and Photo Editing", SIGGRAPH Proeedings 2001, pp. 433-442.*
Rodrigues, "Robust and Hardware-Accelerated 3D Point and Line Reconstruction,"Universidade do Minho, Escola de Engenharia, Nov. 2005.
"Image-Based Modeling and Photo Editing," Oh et al., SIGGRAPH Proceedings, 2001.
L. Zhang, G. Dugas-Phocion, J.-S. Samson, and S. M. Seitz, "Single view modeling of free-form scenes," Journal of Visualization and Computer Animation, 2002, vol. 13, No. 4, pp. 225-235.
J. McCann and N. S. Pollard. Real-time Gradient-domain Painting, ACM Transactions on Graphics (SIGGRAPH 2008), Aug. 2008, vol. 27. No. 3.
P. Joshi, N. Carr. Repousse: Automatic inflation of 2D artwork. "Eurographics Workshop on Sketch-Based Modeling," 2008.
A. Agrawal, R. Raskar, R. Chellappa. "What is the Range of Surface Reconstructions from a Gradient Field?" European Conference on Computer Vision, 2006.
Kanade, et al., Virtualized Reality: Concepts and Early Results, IEEE 1995, pp. 69-76.

* cited by examiner

*Primary Examiner* — Joni Richer
*Assistant Examiner* — Michelle Chin
(74) *Attorney, Agent, or Firm* — Wolfe-SBMC

(57) ABSTRACT

A method, system, and computer-readable storage medium for determining a depth map from a single image. An image is displayed on a computer display, where the displayed image corresponds to image data. User input via is received via one or more tools applied to the displayed image, where the user input specifies one or more depth constraints for at least a portion of the image. A depth map for the image data is automatically determined subject to the one or more depth constraints, and a representation of the depth map is displayed on the computer display.

47 Claims, 10 Drawing Sheets

GENERATING A DEPTH MAP BASED ON A SINGLE IMAGE

PRIORITY DATA

This application claims benefit of priority to U.S. Provisional Application Ser. No. 61/097,388 titled "Generating a Depth Map Based on a Single Image Automatic Video Image Segmentation", filed Sep. 16, 2008, whose inventors are Stephen Diverdi and Jonathan D. Ventura, and which is hereby incorporated by reference in its entirety.

BACKGROUND

1. Field of the Invention

The present invention is directed generally to digital image processing, and more particularly to generation of a depth map from a single image.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways.

There are many digital image applications that require determination of a depth map for an image, e.g., determining relative depth values of a foreground image or object/region of interest and a background. More specifically, a depth map is a channel of pixel data associated with an image, where each value represents the distance from the camera to the scene along that ray. Depth map data make many image manipulation tasks significantly easier, such as proper compositing (including occlusion), rendering depth (or height) of field or focus (or defocus) effects, adding image haze, relighting, foreground/background filters, image editing, e.g., wrapping a texture onto a surface, postprocessing effects for static scenes, and novel view synthesis, e.g., changing "camera location" after a picture has been taken, among others. Automatic creation of depth maps from images often requires special hardware, multiple images of a single scene, or is severely restricted in the types of scenes that can be handled. For single images of scenes (the overwhelming majority of cases), robust depth map creation requires user input—generally this is done in the form of 3D modeling of the scene in an application such as Autodesk's Maya™ or 3D Studio Max™. However, modeling 3D geometry is a laborious task that requires inferring significant amounts of scene content that may not be visible, or even physically possible (e.g. in the case of a painting with errors in perspective). Conversely, specifying the depth of each portion of an image is a relatively easy task for a user. Prior art approaches to taking user's sparse input and creating dense, smooth depth values over an entire image have generally required powerful and expensive tools.

SUMMARY

Various embodiments of systems, methods, and computer-readable storage media for determining a depth map from a single image are presented.

First, an image may be displayed on a computer display, where the displayed image corresponds to image data, e.g., stored on a memory medium. Note that the image data may be in any of a variety of digital image formats.

User input may be received via one or more tools applied to the displayed image, where the user input specifies one or more depth constraints for at least a portion of the image. In some embodiments, the one or more tools may be similar to image manipulation tools, e.g., digital painting or drawing tools, such as digital brushes, pens, erasers, and so forth, but directed to modifying attributes of or related to a depth map for the image data, rather than color. Thus, for example, the tools may be used in accordance with a digital "painting" metaphor, where, for example, the user "paints" (or draws, etc.) on an image to create or modify a depth map, e.g., by changing parameters of a solver and thus affecting the resulting depth map. Such tools may thus be referred to as "brushes", although any other names or terms may be used as desired. Moreover, the various functionalities described below may be implemented in any of various ways, e.g., as separate tools, as one or more multi-tools, etc., as desired.

In one embodiment, the one or more tools may include a hill tool, e.g., a "hill brush" (or pencil/pen), which may set or adjust the curvature (i.e., grad of the div) values $f_i$ to or by some positive value at pixel locations where the user drags the mouse, where the magnitude of the values may be a user-tunable parameter. Note that the curvature at a pixel location specifies the relationship between the depth value at that location with respect to the average depth value of that pixel's neighbors. Thus, this tool may "push up" or lift the depth map solution (or constraint) along the brush stroke, which corresponds to making the depth value of that pixel more negative with respect to its neighbors. Conversely, a "valley tool" or "valley brush" (or pencil/pen) may set or adjust the curvature values to or by some negative value to push down or lower the solution at locations painted with the brush, thus increasing the relative depth at that location with respect to its neighbors. The "hill" and "valley" brushes may set the curvature ($f_i$) values to some value, or may adjust the values by a relative amount. The "hill" and "valley" brush effects may be implemented as a single tool, e.g., a combination brush, that can be configured to increase or decrease the curvature values of brushed areas.

In one embodiment, the one or more tools may include an edge tool (or brush pencil/pen) that may operate to create an edge in the depth map along the user's stroke by setting the horizontal and vertical gradient to be perpendicular to the direction of the stroke.

Absolute positioning may be achieved via a depth tool, e.g., a "depth brush", which may fix the depth value of pixels along the brush stroke, where the fixed value can be set by the user. This tool may effectively set Dirichlet boundary conditions inside the solution domain. Alternatively, or additionally, the depth brush may increment or decrement depth values by some specified amount.

The one or more tools may include a scissors tool that may operate to "cut" the pixel grid by decreasing neighborhood weights along the stroke. This may control, e.g., restrict, diffusion of depth values between pixels, and may be useful for separating foreground objects from the background.

The one or more tools may include a blur (or erase) tool that may operate to remove any constraints currently specified for affected areas. This tool may thus allow the user to erase inappropriate constraints.

In some embodiments, the one or more tools may include a detail tool, e.g., a "detail brush" that may be used to transfer fine detail from the image into the depth map. For example, this tool may directly copy or map an image gradient into a corresponding depth gradient (possibly with scaling). In one embodiment, a "deep is dark" assumption may be made, where darker values in the image correspond to lower depths in the depth map, and conversely, where lighter values in the image correspond to greater depths in the depth map.

Thus, tools such as those described above may be used to "paint" a depth map that corresponds to the image data, as described in more detail below.

A depth map for the image data may be automatically determined subject to the one or more depth constraints. For example, a solver may be used to solve a system of linear equations subject to the specified constraints. Note that the curvature $f$ may be considered to be a desired curvature map corresponding to the depth map, i.e., $f$ is a set of values, e.g., a vector of values, one per pixel, and may be considered to be a source term, where a non-zero $f$ implies non-zero curvature of the depth map.

The specified constraints may include depth values, curvature values, and/or weight values, and so the solver may operate to determine values of the depth map that are not already specified as constraints. Thus, in some embodiments, the solver may determine values of the depth map for those linear equations that are not fixed (e.g., by constraints). For example, if a depth value has been set as a constraint, that value may not be changed by the solver, but may serve as a constraint with respect to the determination of other (non-fixed) depth values. Note that in some embodiments, if a depth value constraint and a curvature constraint are mutually contradictory, the depth value constraint may preempt the curvature constraint. Note further that for convenience, all constraints discussed herein with respect to the determination of the depth map are referred to as "depth constraints", including curvature constraints, weight constraints, etc.

As noted above, any of various solvers and solution techniques may be used as desired. For example, in one embodiment, a multi-grid approach may be used, e.g., with a Poisson solver, as is well known in the art of numeric methods. As those of skill will readily understand, solvers may be applied to systems of linear equations (with constraints) to determine minimal surfaces that satisfy the specified constraints, similar to a minimal energy soap film stretched over a nonlinear wire framework. In other words, the solver may determine a substantially minimal energy surface (depth map) that substantially satisfies the specified constraints. Note that the function $f$, which, as noted above, may represent a "curvature map" corresponding to the depth map, may be a desired feature or target attribute of the computed depth map, but may not be strictly enforced. In other words, the solver may determine a depth map (surface) that satisfies the curvature constraints (as specified by the curvature map) as much as possible, given other constraints that may also be specified for the system, examples of which are now described. Note that as used herein, the term "substantially" means "within some tolerance or error". Thus, for example, "substantially" may mean "within some specified percent of the mathematical optimum". Thus, in various embodiments, this term may mean that the solution is within 20%, 10%, 5%, 2%, 1%, etc., of the optimum solution. Note, however, that the specified tolerance may be any value desired.

A representation of the depth map may be displayed on the computer display, e.g., in a graphical user interface (GUI). In various embodiments, the representation of the depth map may assume any of various forms. For example, in one embodiment, the representation of the depth map may include an overlay of the image, such that both the image and depth information (i.e., the representation of the depth map) are visible to the user. In one embodiment, displaying the image and displaying the representation of the depth map may be performed via such an overlay. Note further that the depth information (the representation of the depth map) may be presented in any of a variety of ways, e.g., as a 3D surface, or as a contour map, among others. Moreover, any type of 3D display technology may be used as desired, including, for example, but not limited to, red-blue stereoscopic display, polarized stereo display, autostereoscopic display, and eye tracking 3D display, among others. In another embodiment, the image and the representation of the depth map may be displayed separately, e.g., side by side, or the user may switch or flip between them. For example, the representation of the depth map may be or include a grayscale image wherein depth values are mapped to luminance values in the grayscale image. However, the overlay approaches may present a more intuitive user interface. Note that in embodiments where the representation of the depth map is a 3D surface with the image overlaid thereon, the user may need to adjust the view angle, i.e., the "camera angle" so that the image plane is not orthogonal to the view axis, so that the depth information (the 3D surface) is apparent, since the 3D surface aspects are not visible when viewed orthogonally. Thus, in some embodiments, the GUI may include controls whereby the user may modify or specify viewing parameters of the representation of the depth map, such as, for example, controls for 3D rotations of the representation, zooming, and panning, among others. In some embodiments, the GUI may also facilitate various filtering functions, whereby the user may (possibly temporarily) modify various aspects of the image, e.g., coloration, to simplify analysis and specification of depth constraints. Similarly, the user may also be allowed to specify various filters or image effects with respect to the representation of the depth map (or other representations, as discussed below).

In some embodiments, the receiving user input, automatically determining the depth map, and displaying the representation of the depth map may be repeated in an iterative manner. In some embodiments, the method may operate interactively, where the user may observe the consequences of the user input substantially immediately.

Thus, various embodiments of the systems and methods disclosed herein may be used to determine a depth map based on a single image.

Figure 1:
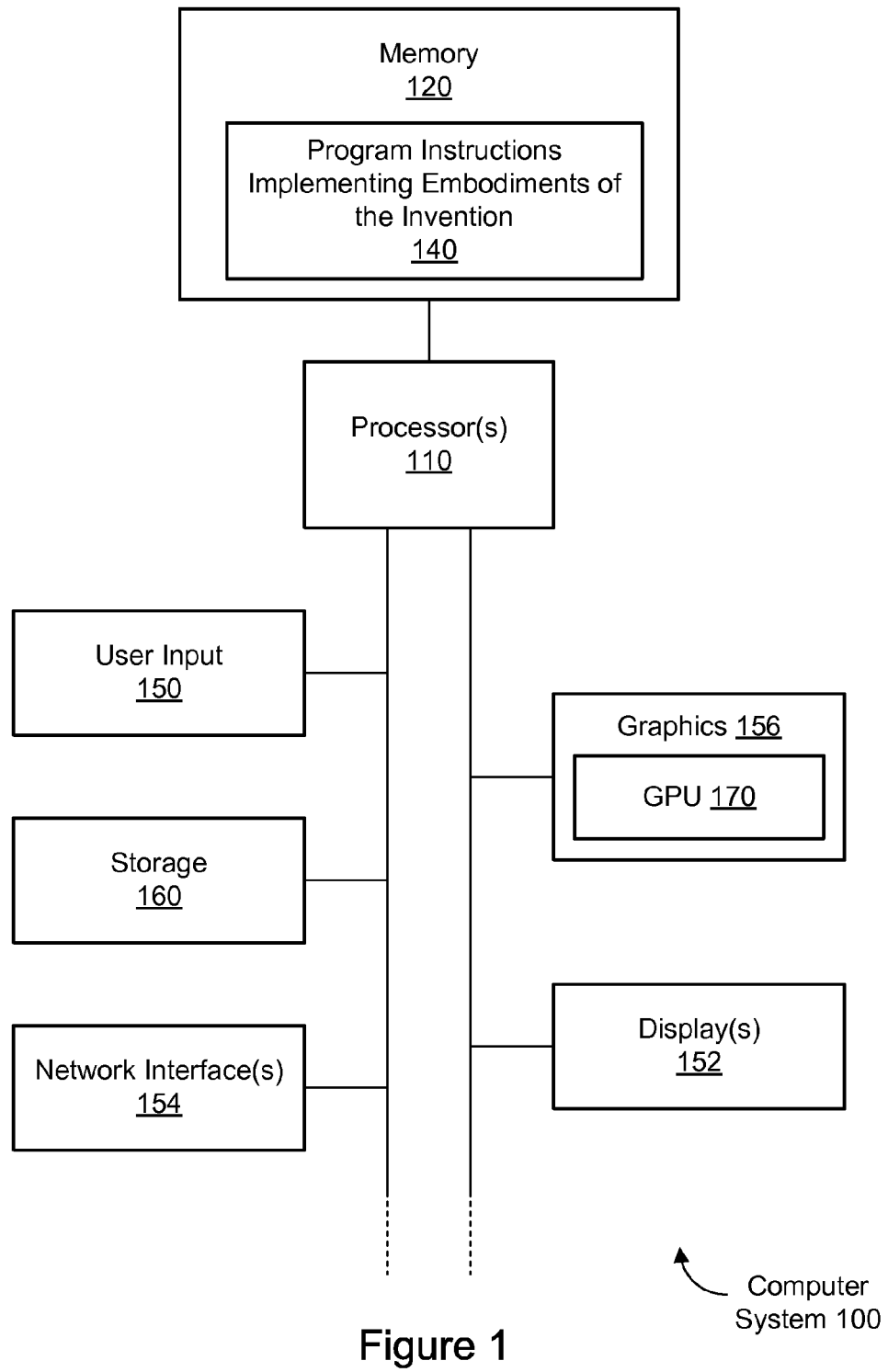
FIG. 1 is a block diagram of an exemplary system configured to implement embodiments of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to automatically generating a depth map from a single image. Examples of applications for such depth maps include, but are not limited to, special effects in digital images or films, e.g., removing or replacing backgrounds, generation of 3D representations from 2D images, applying effects to different image layers, and so forth, as well as scene or image decomposition and analysis, e.g., for scientific or security applications, e.g., monitoring, surveillance, face recognition, etc.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows™ from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
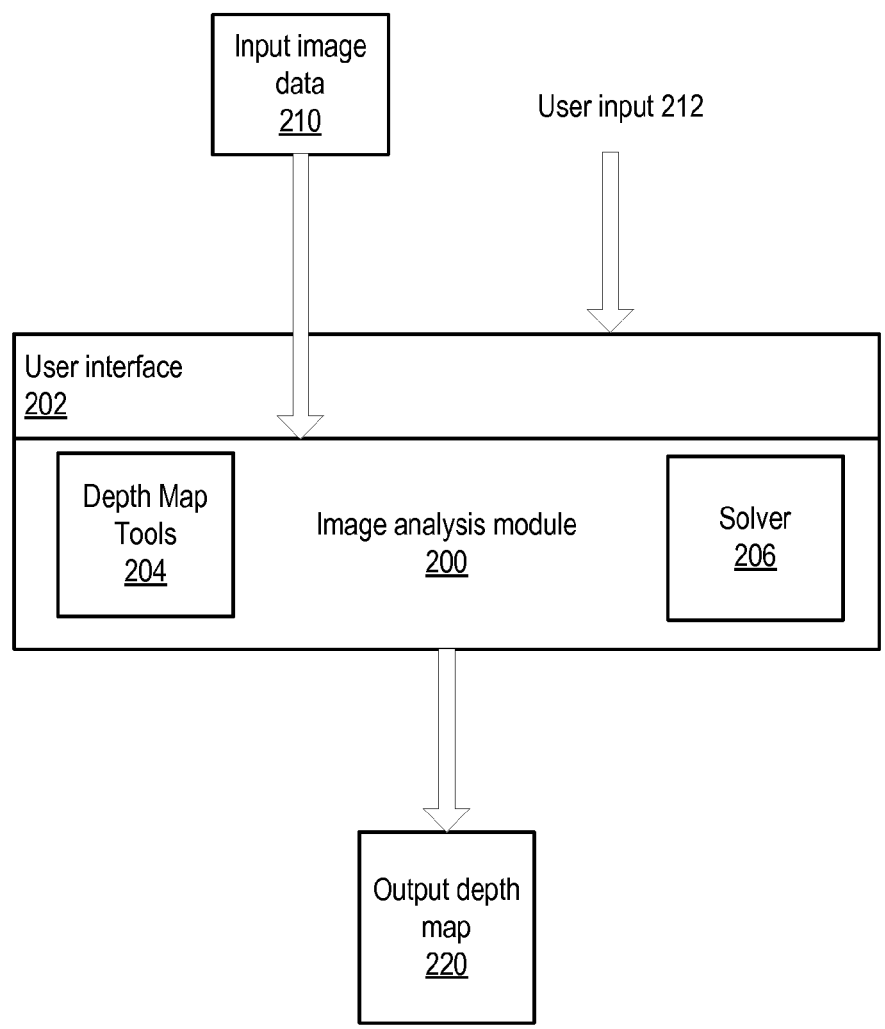
FIG. 2 illustrates an exemplary image processing module, according to one embodiment.

FIG. 2 illustrates an exemplary image analysis module that may implement embodiments of a method for determining or generating a depth map from a single image, as described below with reference to FIG. 3. In one embodiment, module 200 may provide a user interface 202 that includes one or more user interface elements via which a user may initiate, interact with, direct, and/or control the method performed by module 200. Module 200 may be operable to obtain digital image data for a digital image 210, receive user input 212 specifying depth constraints of or for the image data via any of various depth map tools 204, and determine and output a depth map for the image data 220, e.g., via a solver 206.

Image analysis module 200 may be implemented as or in a stand-alone application or as a module of or plug-in for an image processing and/or presentation application. Examples of types of applications in which embodiments of module 200 may be implemented may include, but are not limited to, video editing, processing, and/or presentation applications, as well as applications in security or defense, educational, scientific, medical, publishing, digital photography, digital films, games, animation, marketing, and/or other applications in which digital image editing or presentation may be performed, e.g., where 3D aspects of scenes or image objects are relevant. Specific examples of applications in which embodiments may be implemented include, but are not limited to, Adobe® Photoshop® and Adobe® Illustrator®. In addition to generating output depth map 220, module 200 may be used to display, manipulate, modify, and/or store the depth map and/or image, for example to a memory medium such as a storage device or storage medium.

Overview

Embodiments of the techniques disclosed herein may provide for the creation of depth maps based on single images via user input. At its core is a numerical solver that takes a sparse set of constraints about the depth data in an image and solves for a dense, smooth set of depth values that satisfy those constraints. Constraints may be specified by the user via a set of tools that use a brushing metaphor for intuitive input.

Depth Maps

In some embodiments, a depth map u may be formulated as the solution to a modified version of Poisson's equation:

$$\nabla^2 u = f \quad (1)$$

where $f$ is the desired Laplacian of the depth map. More specifically, $f$ is the desired gradient of the divergence (grad of the div) of the depth map. Said another way, $f$ is the desired curvature of the depth field, i.e., the degree of convexity or concavity of the depth values. Note that when $f=0$, the expression is equivalent to Laplace's equation, and thus may facilitate or implement smoothing of an input depth map. Note further that while the attribute "depth" is used herein, in other embodiments, this attribute may be represented as or considered to be "height", which may differ in sign.

This partial differential equation (PDE) may be discretized onto a regular grid using finite differencing to generate a linear system of equations, with one variable $u_i$ for each pixel in the depth map, where $u_i$ represents depth of a pixel. Thus, for each unknown $u_i$, there is a corresponding equation:

$$\sum_{j \in N} w_{ij}(u_j - u_i) = f_i \quad (2)$$

where N represents the pixel's neighborhood, e.g., the four-way pixel neighborhood, $w_{ij}$ are weights that determine or specify the amount of depth diffusion between neighboring pixels, and $u_j - u_i$ is the difference in depth between the pixel and a neighbor. Note that when all weights have a value of 1, the system is equivalent to the ordinary (isotropic) Poisson's equation. Neumann boundary conditions may be used at the edges of the depth map, i.e., the derivative of the depth at the boundaries may be zero. This system can be solved efficiently (e.g., by a solver) using any of various solution techniques, e.g., using multi-grid methods, and may be suitable for GPU (graphics processing unit) implementation.

Figure 3:
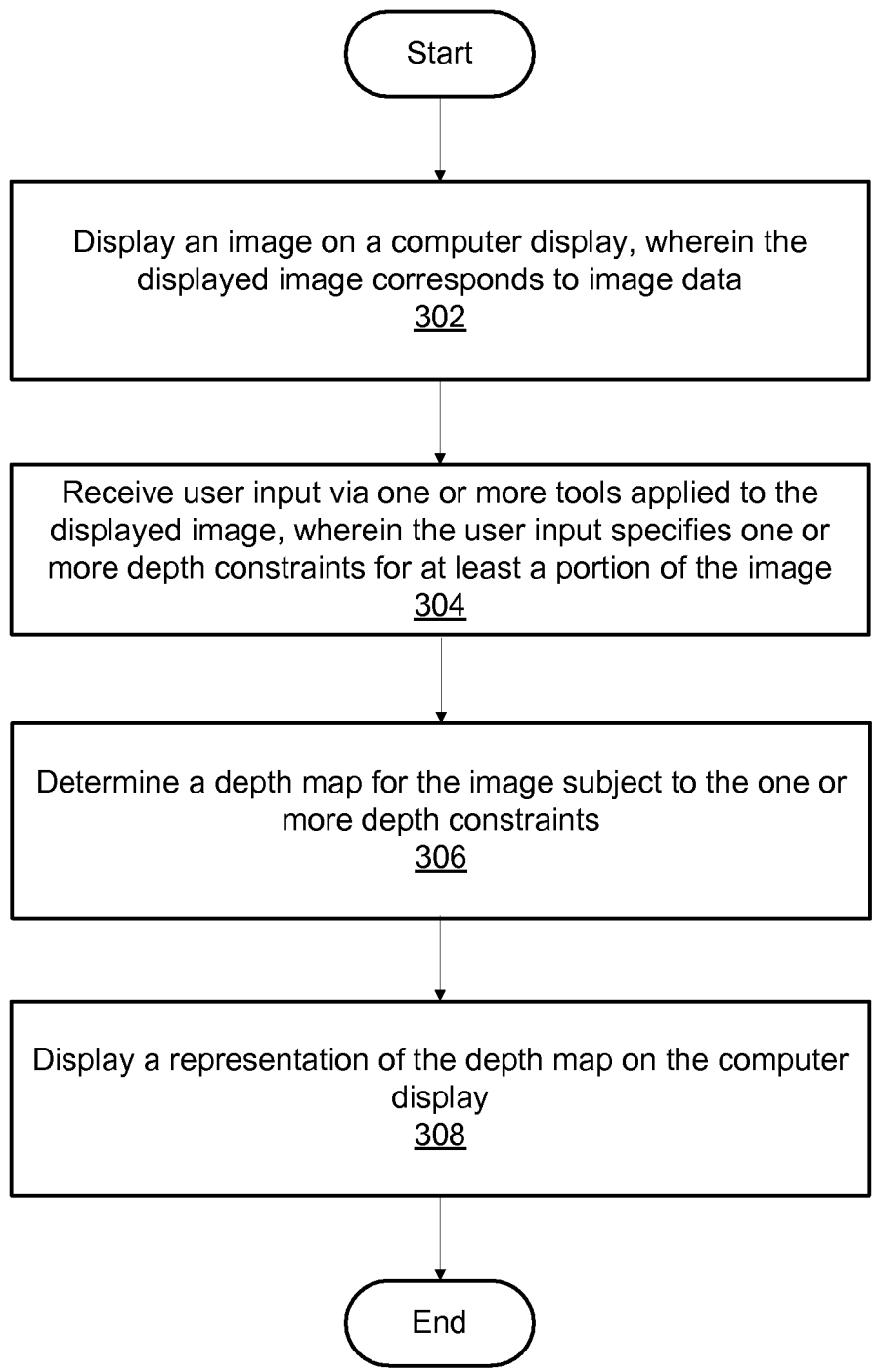
FIG. 3 is a flowchart illustrating a method for generating a depth map, according to one embodiment.

FIG. 3—Flowchart of a Method for Generating a Depth Map Based on a Single Image

FIG. 3 is a flowchart illustrating a method for generating a depth map based on a single image. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 302, an image may be displayed on a computer display, where the displayed image corresponds to image data, e.g., stored on a memory medium. Note that the image data may be in any of a variety of digital image formats.

In 304, user input may be received via one or more tools applied to the displayed image, where the user input specifies one or more depth constraints for at least a portion of the image. In some embodiments, the one or more tools may be similar to image manipulation tools, e.g., digital painting or drawing tools, such as digital brushes, pens, erasers, and so forth, but directed to modifying attributes of or related to a depth map for the image data, rather than color. Thus, for example, the tools may be used in accordance with a digital "painting" metaphor, where, for example, the user "paints" (or draws, etc.) on an image to create or modify a depth map, e.g., by changing parameters of a solver and thus affecting the resulting depth map. Such tools may thus be referred to as "brushes", although any other names or terms may be used as desired. Similarly, the names used below to refer to various exemplary tools are for convenience only, and are not intended to limit the tools to any particular function, form, or appearance. Moreover, the various functionalities described below may be implemented in any of various ways, e.g., as separate tools, as one or more multi-tools, etc., as desired. It should also be noted that the particular tools and functionalities described below are intended to be exemplary only, and are not intended to limit the tools to any particular form, function, or appearance.

In one embodiment, the one or more tools may include a hill tool, e.g., a "hill brush" (or pencil/pen), which may set or adjust the curvature (i.e., grad of the div) values $f_i$ to or by some positive value at pixel locations where the user drags the mouse, where the magnitude of the values may be a user-tunable parameter. Note that the curvature at a pixel location specifies the relationship between the depth value at that location with respect to the average depth value of that pixel's neighbors. Thus, this tool may "push up" or lift the depth map solution (or constraint) along the brush stroke, which corresponds to making the depth value of that pixel more negative with respect to its neighbors. Conversely, a "valley brush" may set or adjust the curvature values to or by some negative value to push down or lower the solution at locations painted with the brush, thus increasing the relative depth at that location with respect to its neighbors. As indicated above, in various embodiments (or under various configurations), the hill and valley brushes may set the curvature values for image pixels to some specified value, or may adjust (i.e., raise or lower) the curvature value by some specified amount. In other words, the "hill" and "valley" brushes may set the curvature ($f_i$) values to some value, or may adjust the values by a relative amount.

In one embodiment, the "hill" and "valley" brush effects may be implemented as a single tool, e.g., a combination brush, that can be configured to increase or decrease the curvature values of brushed areas, e.g., via user specification of a corresponding parameter (e.g., "+" or "−"), via left and right mouse buttons, etc., as desired. Of course, any other means of configuring the tools may be used as desired.

In one embodiment, the one or more tools may include an edge tool, e.g., an "edge brush" (or pencil/pen) that may operate to create an edge in the depth map along the user's stroke by setting the horizontal and vertical gradient to be perpendicular to the direction of the stroke. Appropriate values for the depth may be calculated from the horizontal and vertical gradient values using finite differencing.

Absolute positioning may be achieved via a depth tool, e.g., a "depth brush" (or pencil/pen), which may fix the depth value of pixels along the brush stroke, where the fixed value can be set by the user. This tool may effectively set Dirichlet boundary conditions inside the solution domain. Alternatively, or additionally, the depth brush may increment or decrement depth values by some specified amount. As with the hill and valley brushes described above, in some embodiments, the user may configure the depth brush to perform the desired functionality as needed, e.g., to specify absolute vs. relative settings, etc.

The one or more tools may include a scissors tool that may operate to "cut" the pixel grid by decreasing neighborhood weights along the stroke. This may control, e.g., restrict, diffusion of depth values between pixels, and may be useful for separating foreground objects from the background.

The one or more tools may include a blur (or erase) tool that may operate to remove any constraints currently specified for affected areas. This tool may thus allow the user to erase inappropriate constraints. In one embodiment, this tool may remove all constraints with a single pass, e.g., returning the target curvature $f_i$ to 0. In an alternative embodiment, the erase tool may decrease the constraint by some specified amount with each pass of the tool.

In some embodiments, the one or more tools may include a detail tool, e.g., a "detail brush" that may be used to transfer fine detail from the image into the depth map. For example, in one embodiment, this tool may directly copy or map an image gradient into a corresponding depth gradient (possibly with scaling). In other words, this tool may operate to map intensity or luminance gradients in the image to depth gradients. In one embodiment, a "deep is dark" assumption may be made, where darker values in the image correspond to lower depths in the depth map, and conversely, where lighter values in the image correspond to greater depths in the depth map. Note that this is generally true in the case of fine details such as wrinkles on a face. Thus, in some embodiments, the user may "paint" a portion of the image, e.g., a face, and the painted portion of the image may be analyzed, and luminance data, e.g., intensity gradients (or boundaries), may be mapped to depth gradients (or boundaries) in the depth map.

In some embodiments, the tools, e.g., brushes, may operate such that repeated passes (e.g., while holding the mouse key down) with the brush increment (or decrement) the values each pass (or accumulate effects according to some nonlinear scheme), or, alternatively, the applied depth effect may "saturate", such that repeated passes for a given tool use have no effect after the initial effect of the first pass. Such "uses" of a tool may be delineated by releasing the mouse button. The particular functionality of the tool regarding multiple passes may be specified or configured by a tool or brush "mode" parameter, e.g., "add", "set value", etc., among others.

Thus, tools such as those described above may be used to "paint" a depth map that corresponds to the image data, as described in more detail below.

As noted above, in some embodiments, the user may specify various parameters of the tools. In other words, the user may specify the degree of depth effect. For example, the user may invoke (e.g., via a right mouse click) a configuration dialogue box (or other graphical user interface (GUI) element) for a tool that may include various fields whereby the user may configure the tool, e.g., by providing input specifying depth or curvature values or effects to be applied by the tool, specifying whether the values to be applied are absolute or relative values, whether repeated passes accumulate effects or saturate, tool width, tool shape, and so forth as desired. In another embodiment, tool parameters may be configured via controls and/or fields presented by the GUI, e.g., in a portion of the GUI that also displays the image/depth map, as illustrated in FIGS. 4-10, described below.

In 306, a depth map for the image data may be automatically determined subject to the one or more depth constraints. For example, a solver may be used to solve a system of linear equations (see equation (2) above) subject to the specified constraints. In other words, the solver may attempt to determine depth values for or of the depth map u that satisfy equation (2). Note that the curvature $f$ may be considered to be a desired curvature map corresponding to the depth map, i.e., $f$ is set of values, e.g., a vector of values, one per pixel, and may be considered to be a source term, where a non-zero f implies non-zero curvature of the depth map. Expressed another way, $f$ is a target curvature of the depth map.

As explained above, the specified constraints may include depth values, curvature values, and/or weight values, and so the solver may operate to determine values of the depth map that are not already specified as constraints. Thus, in some embodiments, the solver may determine values of the depth map for those linear equations that are not fixed (e.g., by constraints). For example, if a depth value $u_k$ has been set as a constraint, that value may not be changed by the solver, but may serve as a constraint with respect to the determination of other (non-fixed) depth values. Note that in some embodiments, if a depth value constraint and a curvature constraint are mutually contradictory, the depth value constraint may preempt the curvature constraint. Note further that for convenience, all constraints discussed herein with respect to the determination of the depth map are referred to as "depth constraints", including curvature constraints, weight constraints, etc.

As noted above, any of various solvers and solution techniques may be used as desired. For example, in one embodiment, a multi-grid approach may be used, e.g., with a Poisson solver, as is well known in the art of numeric methods. As those of skill will readily understand, solvers may be applied to systems of linear equations (with constraints) to determine minimal surfaces that satisfy the specified constraints, similar to a minimal energy soap film stretched over a nonlinear wire framework. In other words, the solver may determine a substantially minimal energy surface (depth map) that substantially satisfies the specified constraints. Note that the function $f$, which, as noted above, may represent a "curvature map" corresponding to the depth map, may be a desired feature or target attribute of the computed depth map, but may not be strictly enforced. In other words, the solver may determine a depth map (surface) that satisfies the curvature constraints (as specified by the curvature map) as much as possible, given other constraints that may also be specified for the system, examples of which are now described. Note that as used herein, the term "substantially" means "within some tolerance or error". Thus, for example, "substantially" may mean "within some specified percent of the mathematical optimum". Thus, in various embodiments, this term may mean that the solution is within 20%, 10%, 5%, 2%, 1%, etc., of the optimum solution. Note, however, that the specified tolerance may be any value desired.

In some embodiments, additional input may be used to improve depth map determinations. For example, in one embodiment, image (e.g., intensity or luminance) gradients of the image may be used to weight the diffusion process, under the assumption that intensity discontinuities in the image correspond to depth discontinuities in the depth map. A nonlinear mapping may be used to emphasize larger intensity gradients:

$$w_{ij} = e^{-\lambda (I_i - I_j)^2} \quad (3)$$

where I is the intensity or luminance of a pixel, and the parameter λ specifies edge weight fall-off as the intensity gradient increases. Note that $w_{ij} = w_{ji}$. Thus, in some embodiments, the method may include analyzing the intensity or luminance information of the image, e.g., possibly for some specified portion of the image (see the "detail brush" described above), and automatically adjusting the diffusion weights based on intensity or luminance (or, in some embodiments, color) gradients of the image. Thus, equation (3) may operate as a modifier for (diffusion) weights based on luminance discontinuities.

In some embodiments, rather than starting with a "blank" or uniform depth map, the method may be used to improve depth values or maps produced by other means and methods, e.g., by automatic methods such as stereo disparity estimation, laser range-finding, or multi-view geometry estimation. These methods usually produce high-confidence depth estimates for a subset of pixels in the image. Embodiments of the method disclosed herein may be used to interpolate these depths through the rest of the image, e.g., by fixing the known depths as boundary conditions. For example, in one embodiment, input may come from such external sources, e.g. laser rangefinder, multi-view geometry, stereo camera, etc., where depth data from these external sources may be read in or imported as a boundary constraint, and user input may then be used as described above to improve the depth map. The intensity-based edge weighting described above may improve the quality of these results over normal isotropic smoothing. Thus, such auxiliary depth information may be input (e.g., imported), and used as additional depth constraints in the present method.

In 308, a representation of the depth map may be displayed on the computer display, e.g., in a graphical user interface (GUI). In various embodiments, the representation of the depth map may assume any of various forms. For example, in one embodiment, the representation of the depth map may include an overlay of the image, such that both the image and depth information (i.e., the representation of the depth map) are visible to the user. In one embodiment, displaying the image and displaying the representation of the depth map may be performed via such an overlay. Note further that the depth information (the representation of the depth map) may be presented in any of a variety of ways, e.g., as a 3D surface, or as a contour map, among others. Moreover, any type of 3D display technology may be used as desired, including, for example, but not limited to, red-blue stereoscopic display, polarized stereo display, autostereoscopic display, and eye tracking 3D display, among others.

In another embodiment, the image and the representation of the depth map may be displayed separately, e.g., side by side, or the user may switch or flip between them. For example, the representation of the depth map may be or include a grayscale image wherein depth values are mapped to luminance values in the grayscale image.

However, the overlay approaches may present a more intuitive user interface. Note that in embodiments where the representation of the depth map is a 3D surface with the image overlaid thereon, the user may need to adjust the view angle, i.e., the "camera angle" so that the image plane is not orthogonal to the view axis, so that the depth information (the 3D surface) is apparent, since the 3D surface aspects are not visible when viewed orthogonally. Thus, in some embodiments, the GUI may include controls whereby the user may modify or specify viewing parameters of the representation of the depth map, such as, for example, controls for 3D rotations of the representation, zooming, and panning, among others. In some embodiments, the GUI may also facilitate various filtering functions, whereby the user may (possibly temporarily) modify various aspects of the image, e.g., coloration, to simply analysis and specification of depth constraints. Similarly, the user may also be allowed to specify various filters or image effects with respect to the representation of the depth map (or other representations, as discussed below).

In one embodiment, the method may also include displaying a representation of the curvature map f, discussed above, e.g., possibly in the various manners described above with respect to the representation of the depth map, e.g., as an overlay with the image, etc. In a yet further embodiment, the method may include displaying a representation of a "constraint map", which may include all (or perhaps some, as specified by the user) constraints currently specified for the image data. The representation of the constraint map may thus include depth constraints, curvature constraints, weight constraints (e.g., regarding diffusion), etc., as desired, and in some embodiments, may visually indicate the type of each constraint, e.g., may label or represent the different types of constraints via color or other visual effects.

In some embodiments, the receiving user input, automatically determining the depth map, and displaying the representation of the depth map may be repeated in an iterative manner. In other words, the above method elements may be performed iteratively, allowing the user to interactively "paint" or "draw" depth features for image data. In one embodiment, the automatically determining the depth map, and displaying the representation of the depth map may be performed approximately as the user provides the input. In other words, in some embodiments, the method may operate interactively, where the user may observe the consequences of the user input substantially immediately.

It should be noted that various other features may be incorporated as desired. For example, in one embodiment, undo/redo editing functionality may be provided, whereby the user may easily undo sequences of one or more editing operations. More generally, in various embodiments, any of various editing features and functionalities known in the art may be incorporated.

EXAMPLES

FIGS. 4-10 illustrate exemplary screenshots demonstrating various aspects of the present invention, according to one embodiment. Note that the figures and the effects illustrates are intended to be exemplary only, and are not intended to limit the types of images, tools, effects, or GUI to any particular form, function, or appearance.

Figure 4:
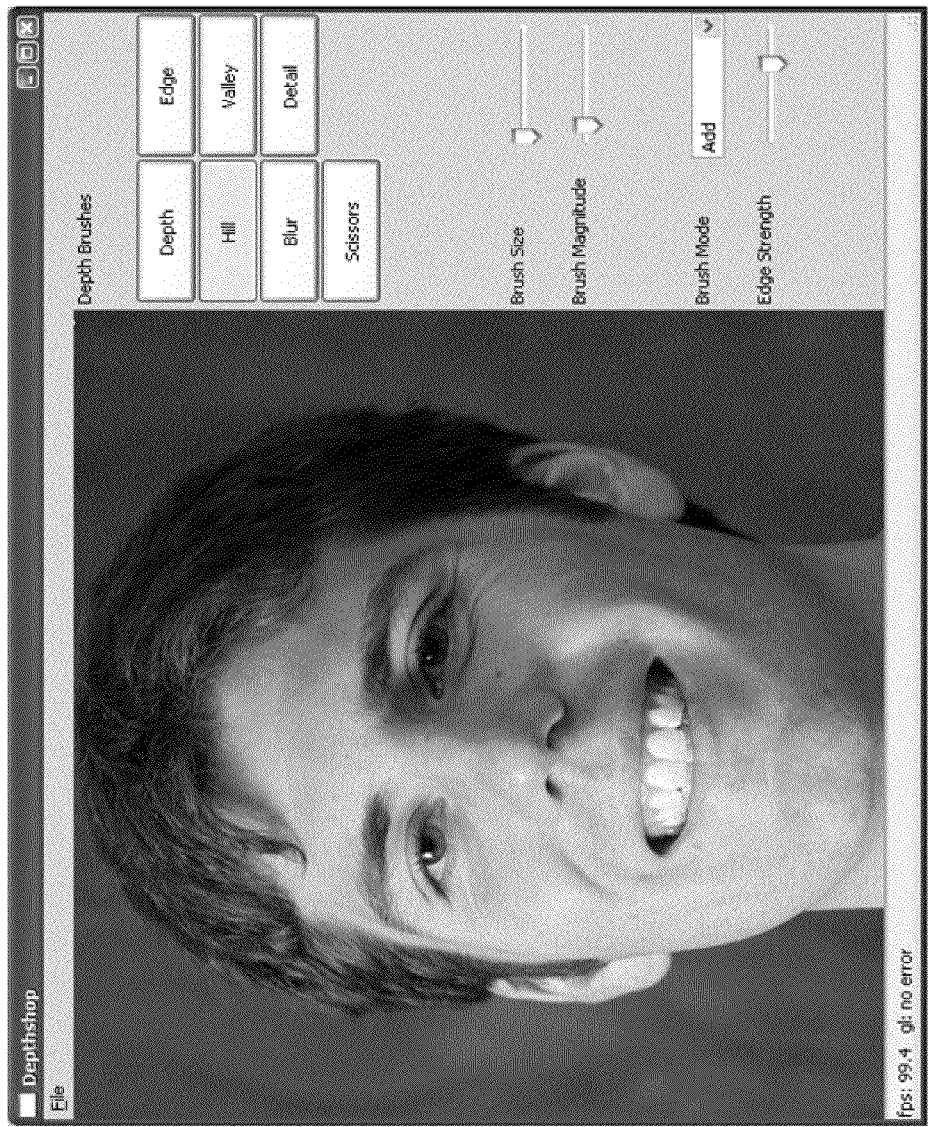
FIG. 4 illustrates an exemplary graphical user interface displaying an initial image, according to one embodiment.

FIG. 4 illustrates an exemplary graphical user interface (GUI) displaying an initial image, in this case, a man's face. As may be seen, in this embodiment of the GUI, various depth map tools may be invoked via a tool selection portion of the GUI, seen to the right of the displayed face. Note that in this embodiment, the tools include depth, edge, hill, valley, blur, detail, and scissors tools (e.g., image brushes), described above, although it should be noted that other tools may be implemented as desired. As also shown, this GUI also include a tool configuration section (bottom right) that includes various controls for configuring parameters for the tools, e.g., brush size, brush magnitude, brush mode, and edge strength, although other controls may be used as desired.

Figure 5:
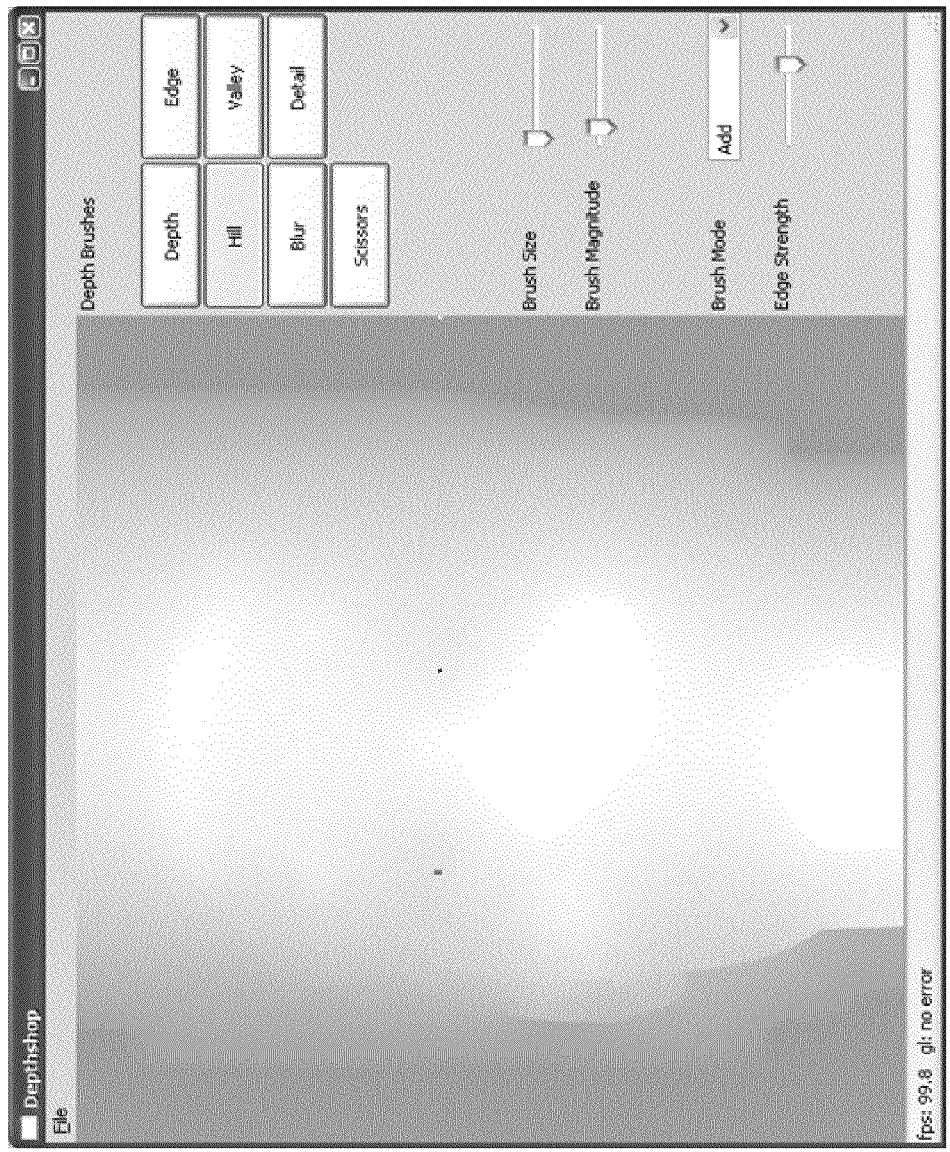
FIG. 5 illustrates an exemplary depth map corresponding to the initial image of FIG. 4, according to one embodiment.

FIG. 5 illustrates an exemplary depth map corresponding to the initial image of FIG. 4, according to one embodiment. More specifically, FIG. 5 illustrates a representation of a depth map. In this particular embodiment, the depth map is represented as a gray scale image, where "darker" denotes greater depth (less height), and conversely, "lighter" denotes less depth (greater height).

Figure 6:
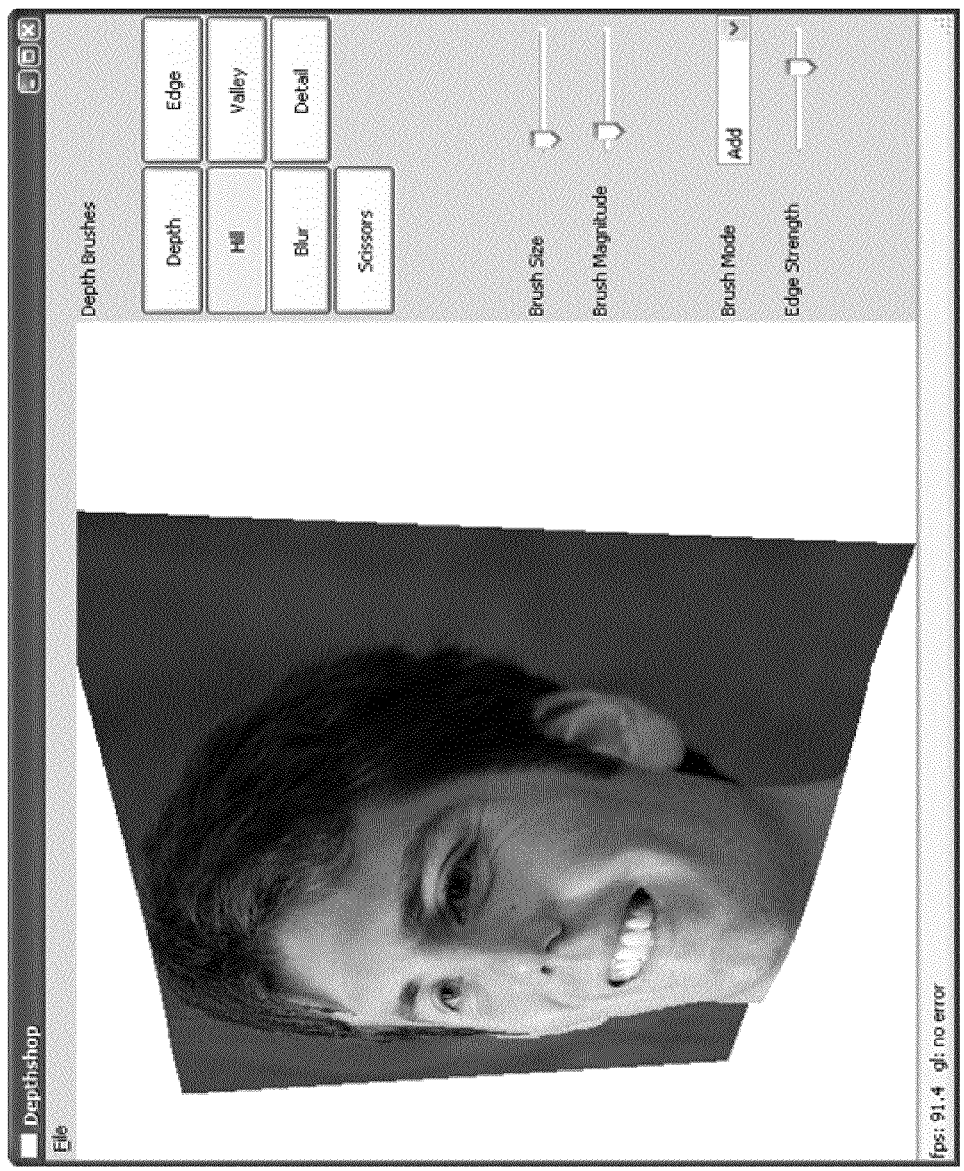
FIG. 6 illustrates an exemplary 3D effect based on combining a representation of the depth map of FIG. 5 with the original image of FIG. 4, according to one embodiment.

FIG. 6 illustrates an exemplary 3D effect based on combining a representation of the depth map of FIG. 5 with the original image of FIG. 4, according to one embodiment. Note that the 3D effect is only apparent when the image has been rotated out of the original image plane, i.e., when the "camera view" has been changed from the original orthogonal setting (viewing the image "head on"). Note also that in this representation of the depth map, the depth information is denoted by depth (height) values, rather than the grayscale values of the depth map representation shown in FIG. 5. Thus, by overlaying the color image with the depth map, the user may clearly see the effects of the depth constraints specified via the various tools applied to the image or (overlaid) depth map.

Figure 7:
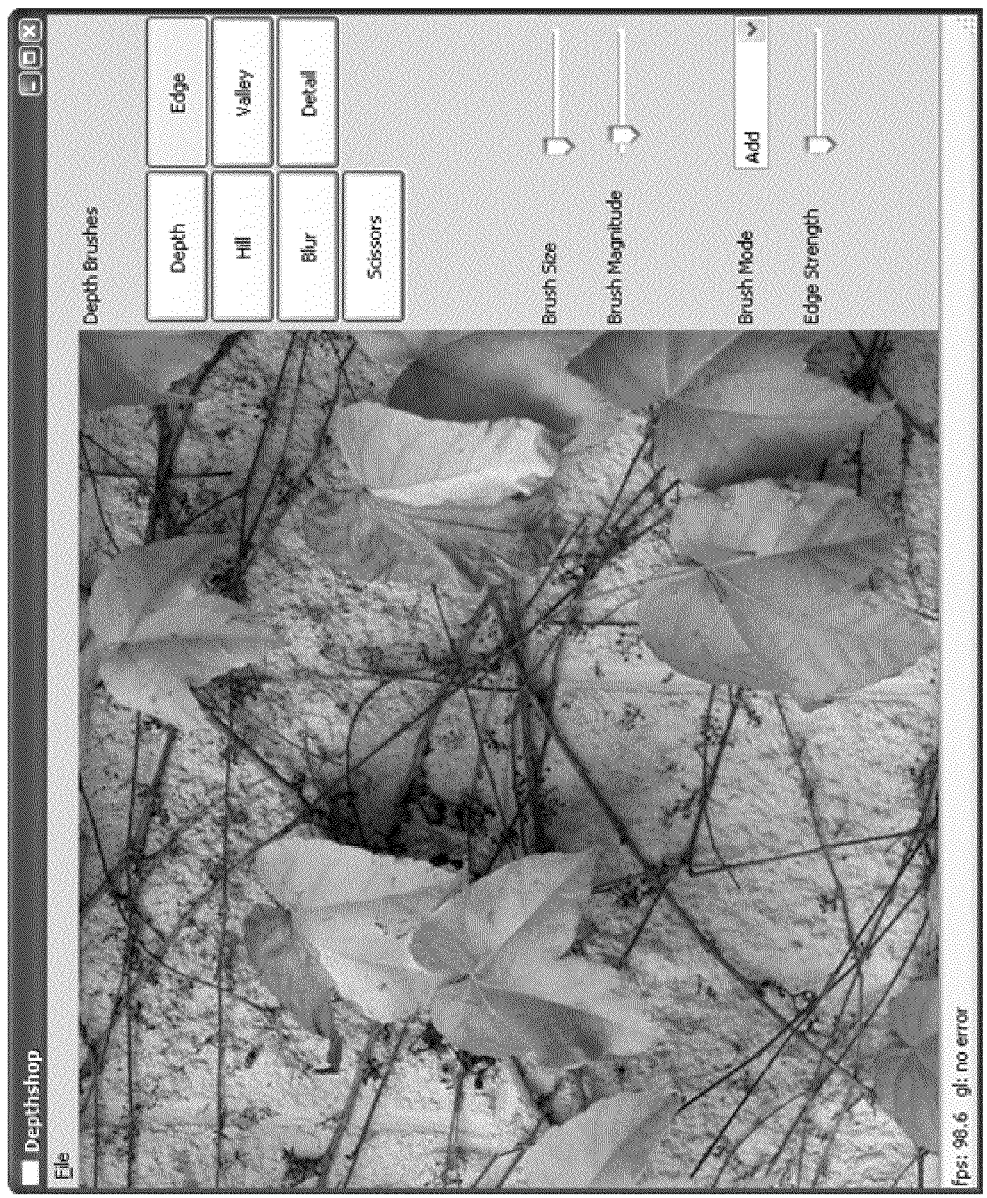
FIG. 7 illustrates the exemplary graphical user interface of FIG. 4, but displaying a different initial image, according to one embodiment.
Figure 8:
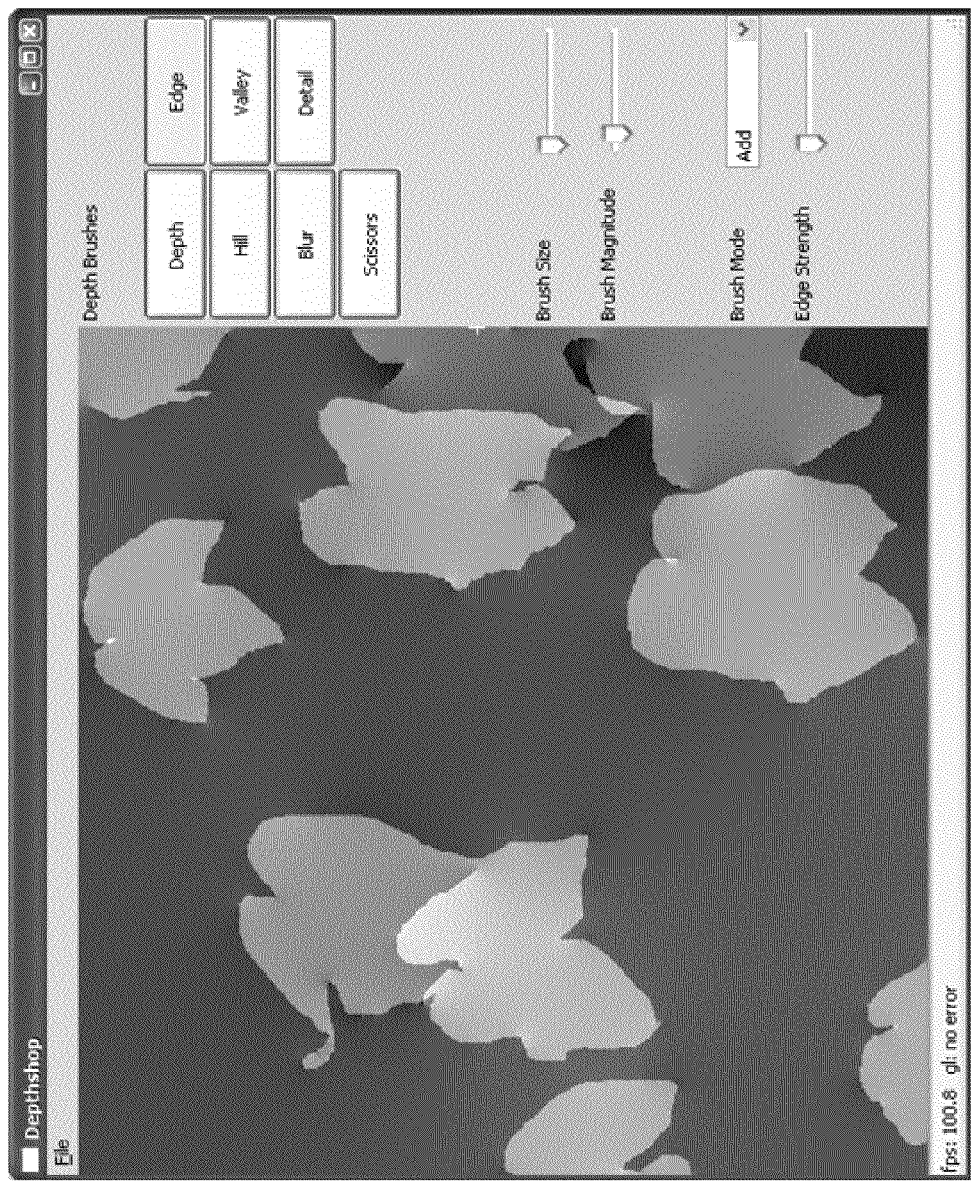
FIG. 8 illustrates an exemplary depth map corresponding to the initial image of FIG. 7, according to one embodiment.

FIG. 7 illustrates the exemplary graphical user interface of FIG. 4, but displaying a different initial image, according to one embodiment. As may be seen, in this example, the image is of leaves. FIG. 8 illustrates an exemplary depth map corresponding to the initial image of FIG. 7, according to one embodiment. Similar to FIG. 5, in this example, the depth map is represented by a grayscale image, with darker areas denoting greater depth, and lighter areas denoting lesser depth.

Figure 9:
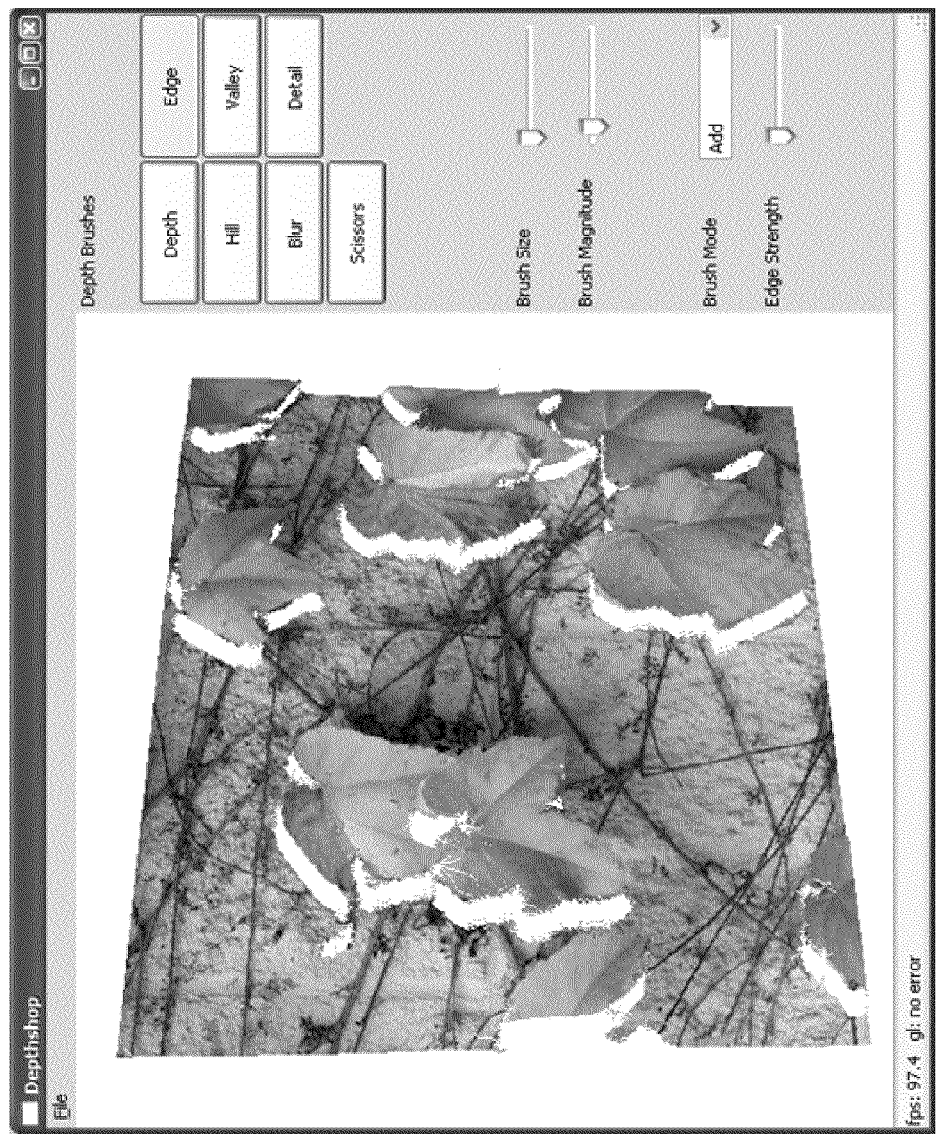
FIGS. 9 and 10 illustrate an exemplary 3D effect based on combining a representation of the depth map of FIG. 8 with the original image of FIG. 7 using different respective camera view angles, according to one embodiment.
Figure 10:
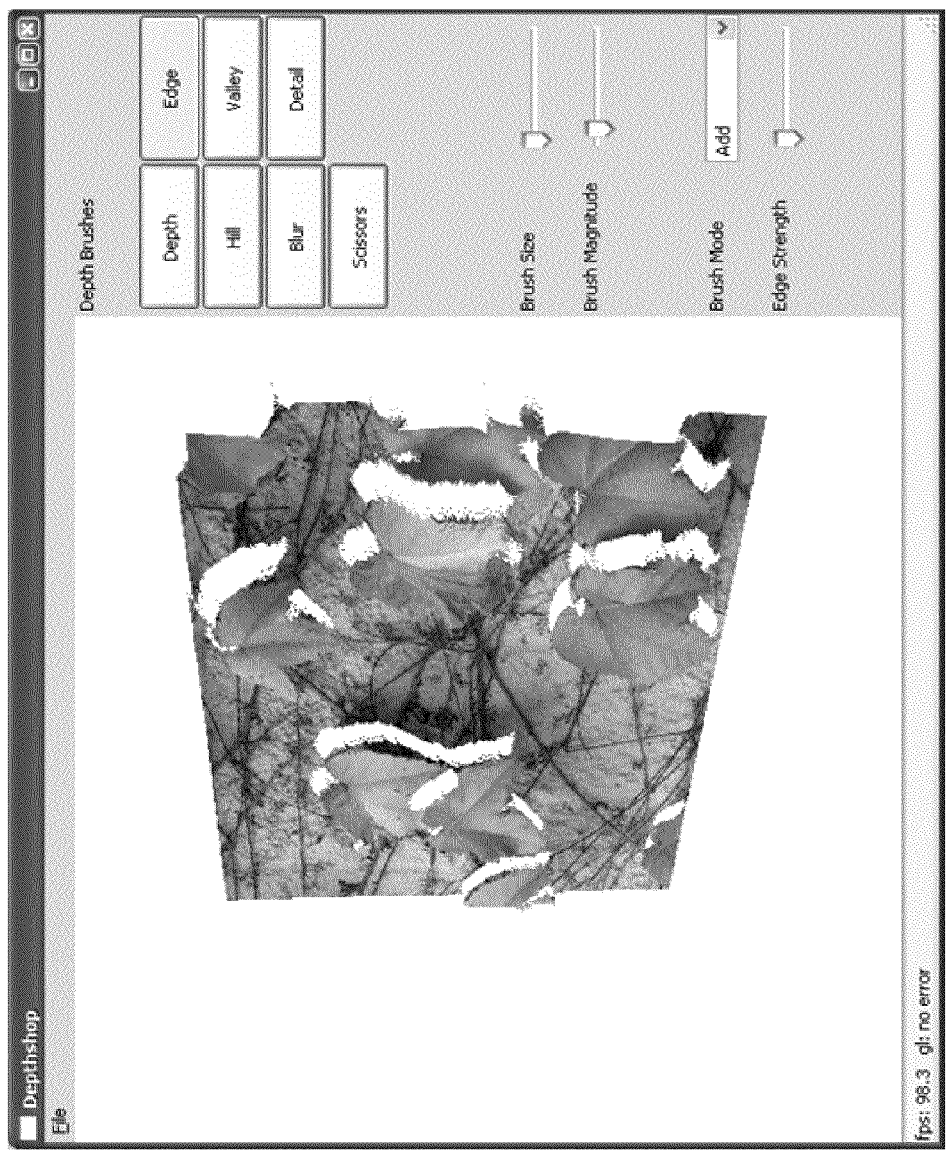

FIGS. 9 and 10 illustrate an exemplary 3D effect based on combining a representation of the depth map of FIG. 8 with the original image of FIG. 7 using different respective camera view angles, according to one embodiment. As with FIG. 6, FIGS. 9 and 10 overlay the color image of the leaves onto the 3D representation of the depth map, thus facilitating intuitive interaction with the image for further editing.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-readable storage medium, excluding signals per se, comprising instructions stored thereon that, responsive to execution on one or more computers, causes the one or more computers to perform operations comprising:
displaying an image on a computer display, the displayed image corresponds to image data;
receiving input via application of one or more tools applied to a specified portion of the displayed image as specified by a user, the input specifying one or more depth constraints for at least the specified portion of the image to set a curvature that specifies a relationship between depth values of pixels in the specified portion with respect to depth values of neighboring pixels, a target curvature corresponding to each pixel determined by a linear system of equations, each equation including weights specifying the amount of depth diffusion between neighboring pixels multiplied by the difference in depth between the pixel and a neighbor pixel, the linear system of equations including an equation for each neighbor pixel in the pixel's neighborhood;
automatically determining a depth map for the image data subject to the target curvature of each pixel and the one or more depth constraints; and
displaying a representation of the depth map on the computer display.

2. The computer-readable storage medium of claim 1, wherein the program instructions are further computer-executable to perform:
repeating said receiving input, said automatically determining the depth map, and said displaying the representation of the depth map in an iterative manner.

3. The computer-readable storage medium of claim 1, wherein the one or more tools further comprise:
an edge tool that sets horizontal and vertical depth gradients perpendicular to a direction of a stroke of the edge tool at pixel locations along a stroke of the edge tool.

4. The computer-readable storage medium of claim 1, wherein the one or more tools further comprise:
a depth tool that sets depth values at pixel locations to a specified value along a stroke of the depth tool.

5. The computer-readable storage medium of claim 1, wherein the one or more tools further comprise:
a scissors tool that decreases neighborhood depth diffusion weights along a stroke of the scissors tool.

6. The computer-readable storage medium of claim 1, wherein the one or more tools further comprise:
an erase tool that decreases constraints currently specified for pixel locations along a stroke of the erase tool.

7. The computer-readable storage medium of claim 1, wherein the one or more tools further comprise:
a detail tool that converts luminance gradients in the image to depth gradients in the depth map for pixel locations along a stroke of the erase tool.

8. The computer-readable storage medium of claim 1, wherein the program instructions are further computer-executable to perform:
configuring one or more parameters of at least one of the one or more tools in response to input.

9. The computer-readable storage medium of claim 1, wherein the automatically determining the depth map comprises solving a system of linear equations with Neumann boundary conditions specifying derivatives of value zero at outer edges of the depth map.

10. The computer-readable storage medium of claim 1, wherein the specified constraints comprise constraints on one or more of:
depth values;
depth curvature values; or depth diffusion weight values.

11. The computer-readable storage medium of claim 1, wherein the depth map comprises a substantially minimal energy surface that substantially satisfies the specified constraints.

12. The computer-readable storage medium of claim 1, wherein at least one of the weights is modified based on luminance discontinuities.

13. The computer-readable storage medium of claim 1, wherein the program instructions are further computer-executable to perform:

receiving auxiliary depth information for the image from at least one external source, wherein one or more of the specified constraints are based on the auxiliary depth information.

14. The computer-readable storage medium of claim 1, wherein said displaying a representation of the depth map on the computer display comprises one or more of:

displaying the depth map separately from the image;
displaying the depth map overlaid on the image;
displaying the depth map as a 3D surface; or displaying the depth map as a contour map.

15. A computer-implemented method, comprising: performing, by a computer:

displaying an image on a computer display of the computer, the displayed image corresponds to image data;

receiving input via application of one or more tools applied to a specified portion of the displayed image as specified by a user, the input specifying one or more depth constraints for at least the specified portion of the image to create an edge, a target curvature corresponding to each pixel of the specified portion of the image calculated by a linear system of equations, each equation including weights specifying the amount of depth diffusion between neighboring pixels multiplied by the difference in depth between the pixel and a neighbor pixel, the linear system of equations including an equation for each neighbor pixel in the pixel's neighborhood;

automatically determining a depth map for the image data subject to the target curvature of each pixel and the one or more depth constraints, the depth map including the edge at the specified portion of the image; and displaying a representation of the depth map on the computer display.

16. The computer-implemented method of claim 15, further comprising:

repeating said receiving input, said automatically determining the depth map, and said displaying the representation of the depth map in an iterative manner.

17. The computer-implemented method of claim 15, wherein the one or more tools further comprise:

a curvature tool that adjusts depth curvature values by a specified amount at pixel locations along a stroke of the curvature tool.

18. The computer-implemented method of claim 15, wherein the one or more tools further comprise:

an edge tool that sets horizontal and vertical depth gradients perpendicular to a direction of a stroke of the edge tool at pixel locations along a stroke of the edge tool.

19. The computer-implemented method of claim 15, wherein the one or more tools further comprise:

a depth tool that sets depth values at pixel locations to a specified value along a stroke of the depth tool.

20. The computer-implemented method of claim 15, wherein the one or more tools further comprise:

a scissors tool that decreases neighborhood depth diffusion weights along a stroke of the scissors tool.

21. The computer-implemented method of claim 15, wherein the one or more tools further comprise:

an erase tool that decreases constraints currently specified for pixel locations along a stroke of the erase tool.

22. The computer-implemented method of claim 15, wherein the one or more tools further comprise:

a detail tool that converts luminance gradients in the image to depth gradients in the depth map for pixel locations along a stroke of the erase tool.

23. The computer-implemented method of claim 15, further comprising configuring one or more parameters of at least one of the one or more tools in response to input.

24. The computer-implemented method of claim 15, wherein the automatically determining includes solving a system of linear equations with Neumann boundary conditions specifying derivatives of value zero at outer edges of the depth map.

25. The computer-implemented method of claim 15 wherein the specified constraints comprise constraints on one or more of:

depth values;
depth curvature values; or depth diffusion weight values.

26. The computer-implemented method of claim 15, wherein the depth map comprises a substantially minimal energy surface that substantially satisfies the specified constraints.

27. The computer-implemented method of claim 15, wherein at least one of the weights is modified based on luminance discontinuities.

28. The computer-implemented method of claim 15, further comprising:

receiving auxiliary depth information for the image from at least one external source, wherein one or more of the specified constraints are based on the auxiliary depth information.

29. The computer-implemented method of claim 15, wherein said displaying a representation of the depth map on the computer display comprises one or more of:

displaying the depth map separately from the image; displaying the depth map overlaid on the image; displaying the depth map as a 3D surface; or displaying the depth map as a contour map.

30. A method comprising:

displaying an image on a computer display, the displayed image corresponds to image data;

receiving input via application of one or more tools applied to a specified portion of the displayed image as specified by a user, the input specifying one or more depth constraints for at least the specified portion of the image to set depth values of pixels in the specified portion, a target curvature corresponding to each pixel determined by a linear system of equations, each equation including weights specifying the amount of depth diffusion between neighboring pixels multiplied by the difference in depth between the pixel and a neighbor pixel, the linear system of equations including an equation for each neighbor pixel in the pixel's neighborhood;

automatically determining a depth map for the image data subject to the target curvature of each pixel and the one or more depth constraints; and displaying a representation of the depth map on the computer display.

31. The method of claim 30, further comprising configuring one or more parameters of at least one of the one or more tools in response to input.

32. The method of claim 30, wherein the automatically determining includes solving a system of linear equations.

33. The method of claim 30, wherein the solving includes solving Neumann boundary conditions specifying derivatives of value zero at outer edges of the depth map.

34. The method of claim 30, wherein the specified constraints comprise constraints on one or more of:

depth values;
depth curvature values; or
depth diffusion weight values.

35. The method of claim 30, wherein the depth map comprises a substantially minimal energy surface that substantially satisfies the specified constraints.

36. The method of claim 35, wherein the substantially minimal energy surface will substantially satisfy the specified constraints when the substantially minimal energy surface is within a specified tolerance of its mathematical optimum, the specified tolerance designatable by a user.

37. The method of claim 35, wherein the substantially minimal energy surface will substantially satisfy the specified constraints when the substantially minimal energy surface is within a specified tolerance of its mathematical optimum, the specified tolerance designatable by a user.

38. The method of claim 30, further comprising receiving auxiliary depth information for the image from at least one external source, wherein one or more of the specified constraints are based on the auxiliary depth information.

39. The method of claim 30, wherein said displaying a representation of the depth map on the computer display comprises one or more of:
displaying the depth map separately from the image;
displaying the depth map overlaid on the image;
displaying the depth map as a 3D surface; or
displaying the depth map as a contour map.

40. A method comprising:
displaying an image on a computer display, the displayed image corresponds to image data;
receiving input via application of one or more tools applied to a specified portion of the displayed image as specified by a user, the input specifying one or more depth constraints for at least the specified portion of the image to decrease an effect of weights specifying the amount of depth diffusion between neighboring pixels along the specified portion, a target curvature corresponding to each pixel determined by a linear system of equations, each equation including the weights of neighboring pixels multiplied by the difference in depth between the pixel and a neighbor pixel, the linear system of equations including an equation for each neighbor pixel in the pixel's neighborhood;
automatically determining a depth map for the image data subject to the target curvature of each pixel and the one or more depth constraints; and
displaying a representation of the depth map on the computer display.

41. The method of claim 40, further comprising configuring one or more parameters of at least one of the one or more tools in response to input.

42. The method of claim 40, wherein the automatically determining includes solving a system of linear equations.

43. The method of claim 42, wherein the solving including solving Neumann boundary conditions specifying derivatives of value zero at outer edges of the depth map.

44. The method of claim 40, wherein the specified constraints comprise constraints on one or more of:
depth values;
depth curvature values; or
depth diffusion weight values.

45. The method of claim 40, wherein the depth map comprises a substantially minimal energy surface that substantially satisfies the specified constraints.

46. The method of claim 40, further comprising receiving auxiliary depth information for the image from at least one external source, wherein one or more of the specified constraints are based on the auxiliary depth information.

47. The method of claim 40, wherein said displaying a representation of the depth map on the computer display comprises one or more of:
displaying the depth map separately from the image;
displaying the depth map overlaid on the image;
displaying the depth map as a 3D surface; or
displaying the depth map as a contour map.

* * * * *